April 23, 1940.   G. T. BALFE   2,197,916
GASKET
Filed Jan. 27, 1937
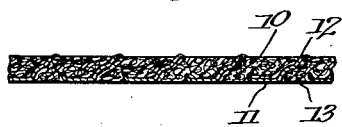
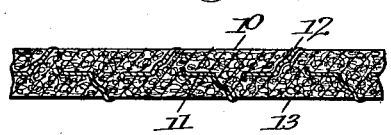
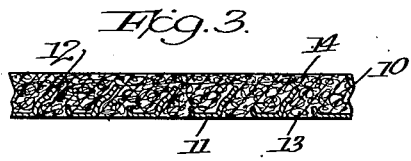
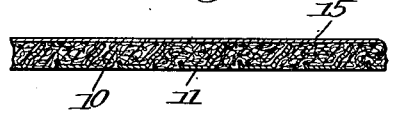
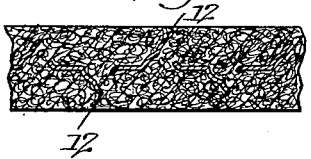
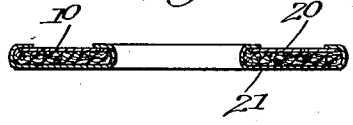
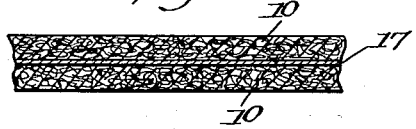
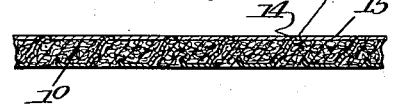
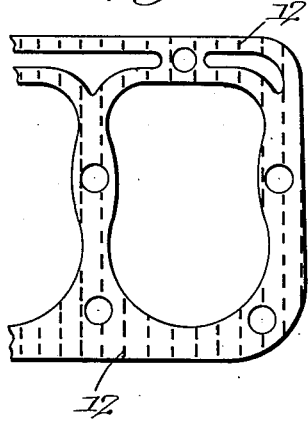
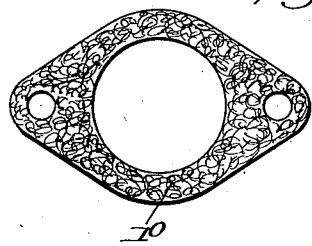
Inventor
George T. Balfe.
By *Cushman Darby & Cushman*
Attorneys Patented Apr. 23, 1940

2,197,916

UNITED STATES PATENT OFFICE 2,197,916

GASKET

George T. Balfe, Detroit, Mich., assignor to Detroit Gasket & Mfg. Company, Detroit, Mich., a corporation of Michigan Application January 27, 1937, Serial No. 122,645

2 Claims. (Cl. 288—29)

The present invention relates to gaskets and gasket material, and more particularly to gaskets for use in the automotive industry, or in association with internal combustion engines where heat and pressure must be resisted.

Heretofore, the internal combustion engine industry, (both gasoline and Diesel) has used for resisting heat and pressure, gaskets consisting of one or more layers of asbestos combined with sheet metal. Such gaskets are typified by the copper-clad gasket consisting of a layer of asbestos clad with copper, and by the gaskets of my Patents Nos. 1,927,450 and 1,776,140, which comprise a sheet-metal insert faced with asbestos clinched to the insert by tangs projecting through the asbestos layers to the surfaces thereof. These combination sheet metal-asbestos gaskets, while providing the required compressibility, have presented a problem because of the relatively low resistance of asbestos to high pressures and its constant tendency to blow. These difficulties have been very largely overcome by the construction of my aforesaid patents.

Although all-metal gaskets have been used in other industries, they have not been employed to any considerable extent in internal combustion engines because they lack the characteristics required for resisting heat and pressure, such as a gasket is subjected to, for example, around the combustion chamber. Moreover, such gaskets lack the compressibility required for conforming to irregularities in the joint surfaces.

I have found that it is possible to provide an "all-metal" gasket having to a very large degree the resistance to pressures characterizing ordinary sheet all-metal gaskets heretofore used in other industries, while at the same time affording substantially the compressibility characteristic of the combination sheet metal-asbestos gasket.

An object of the invention is to provide an all-metal gasket for resisting heat and pressure, for example, around and between the explosion chambers of an internal combustion engine, and which, while providing the strength of the all-metal gasket, affords compressibility comparable to an asbestos gasket.

The gasket consists essentially of one or more layers of metal in fiber-like form. The so-called "metal-wool" formed from steel, copper, or other metals or alloys, is typical of such a product. Metal wool, in its natural state, consists of a fluffy mass of entangled attenuated or elongated fiber-like bodies forming a wad-like, readily compressible mass. These fibers vary in length, usually from one-half an inch to five or six inches or more. I have found that this material, when suitably compressed into layer or sheet-like bodies, and preferably without substantial reduction of the original fiber length, retains its capacity to compress and conform to the joint surfaces and provides very high resistance against deterioration by both heat and pressure. As will be understood, the edge of a gasket around an explosion chamber, for example, is subjected to very high heat and substantial pressures which have been increased of recent years due to the tendency of automotive engineers to raise the compression ratio in the modern automobile engine.

The metallic material may have included therein a suitably resistant binder for causing the fibers to adhere to one another and impart proper density to the product. When I refer, therefore, to an "all-metal" gasket, I do not mean to exclude such a densifying agent or filler, or fiber adhering means, whether such agent or means be metallic or non-metallic. As densifying or adhering agents, I use various materials depending upon the particular condition surrounding the use of the gasket. I prefer to use a filler of a character and in an amount which will not destroy the essential metallic nature of the sheet-like layer. For example, I may use casein or silicate of soda, and, in some instances, a latex composition such as is sold by Collard, Inc. under the name Collard's #2-A Latex. After incorporating the adhering agent in the mass, it is highly compressed to sheet-like form and there is produced a relatively thin layer having high tensile strength and which is highly compressible. In many instances, this sheet-like mass may be used without other reinforcing means, since the form provides a very resistant gasket material which conforms to the joint surfaces and resists both heat and pressure.

Such a body of compressed fiber-like metal or "wool" properly treated, as with a binder, may be suitably combined with metal in sheet form; for example, with an edge binding means such as a grommet around the cylinder openings or around the external edge or other openings. Again, it may be combined with one or more sheet metal facing layers or inserts, all of which tend to maintain a unitary structure and impart the desired rigidity to the gasket.

I am aware that metal wool has heretofore been used in wad-like form for lubricating purposes, and even combined with rubber as entering into the construction of packing wads or glands for pipes and the like. The present invention relates, however, to the use of fibrous metallic material, such as steel wool in layer or substantially sheet-like form, to provide gaskets which are suitable for use in internal combustion engines wherein the gaskets are substantially sheet-like and have a thickness, for example, substantially .060 to .065 before compression, and after compression of approximately .050 to .053. These figures are merely typical, and the invention is not, of course, limited to layer or sheet-like gaskets having these dimensions. So far as I am aware, no one has heretofore suggested the use of individual, entangled metal fiber-like bodies in a compressible state as a heat resistant substantially sheet-like gasket having dominant or primary metallic characteristics.

Gaskets for automotive use, moreover, must have a high strength characteristic in addition to compressibility. It is found possible, by reason of the interlocking fibrous structure of the metal fibrous layer, that there is provided not only compressibility, but also greatly increased strength. This is particularly true when the metal fibrous layer is associated with a layer or insert of sheet metal.

A gasket employing the fibrous metal cushion sealing layer of this invention is non-sticking when exposed between metal surfaces, so that, in many instances, it is unnecessary to employ the customary non-sticking agent, for example, graphite, although this may be employed if desired.

Further, the metal fibrous sealing layer is self-sustaining and does not flow under compression. This resistance to flow is due to the entangled relatively long fiber-like bodies and enables the gasket to be densified or compressed between joint surfaces without extruding therefrom. In this manner, a thorough seal is formed and one which is highly resistant to pressures prevailing at the joint. This self-sustaining characteristic of the metal fibrous layer is further enhanced when the same is associated with a sheet metal reinforce, such as grommets around the edges and a sheet metal facing or insert.

The metal fibrous layer may be made of any required strength and density to afford the desired compressibility and sealing quality. In some instances, a mere compression of the entangled metal fibers may be found satisfactory, particularly when the layer or layers are combined with a sheet-like metal facing or insert. However, I prefer to densify the layer and to render the layer more cohesive and the fibers more adherent to one another. This may be accomplished without destroying the substantial metallic character of the construction, by incorporating fillers of either metallic or non-metallic character, and even by coating the fibers with suitable adhesives, which, when the layer is compressed, tend to cause them to adhere to one another.

The wool may be dipped or otherwise treated with an agent for adhering the fibers together, whereby the strength resulting from the interlocking of the fibers is further enhanced by the cementing action. This latter contributes also to the density of the product. For this purpose, a thermo-plastic cementing agent may be applied to the individual fibers, whereby under heat and pressure, simultaneously applied, the coating on each fiber is softened and the individual fibers adhered to one another to provide a layer having increased density. After the binder is applied to the fibers, the mass is compressed to eliminate excess binder and to form sheets of the desired thickness. When the material is to be used with a metallic insert or reinforce, the sheets may be preformed and then applied to the sheet metal, or they may be finally formed directly on the insert or reinforce.

In referring to use in internal combustion engines, I have particularly in mind the employment of the product of this invention as a cylinder head gasket or manifold gasket, but it can be used, as stated above, not only under the severe conditions surrounding internal combustion engine practice, but, as well, in any instance where a high heat or pressure resistant seal is required. The increased compressibility and heat conductivity, and resistance to various physical and chemical conditions above outlined, as well as its enhanced strength make the gasket available through a wide field of sealing applications.

In the accompanying drawing, I have shown various forms of gasket in which the invention may be embodied, and in all of which the relatively thin or sheet-like layer or layers of metallic fibers, such as steel wool, have combined therewith suitable sheet metal reinforcing or integrating means. Such means, in some instances, takes the form of edge bindings for the cylinder openings and in others is a sheet metal facing or insert.

Referring to the drawing:

Figure 1 is a sectional view showing a fibrous metal layer combined with a sheet metal reinforce.

Figure 2 is a sectional view showing a sheet metal insert and layers of metal fibrous material on opposite sides thereof.

Figure 3 is a sectional view similar to Figure 1 or Figure 2, but in which the projections of the metal insert do not extend to the surface of the gasket.

Figure 3ª is a fragmentary view similar to Figure 3 showing the metallic layers on both sides of the sheet metal.

Figure 4 is a sectional view similar to Figure 1 or Figure 2 in which a surface layer of sheet material, such as thin metal or foil, is provided at the surface of the gasket.

Figure 5 is a sectional view similar to Figure 1 or Figure 2 in which the metal interlay is devoid of projections.

Figure 6 is a sectional view similar to Figure 4 in which the projections extend through the metal surface layer.

Figure 7 is a sectional view showing a layer of metal fibrous material having the openings therein reinforced and protected by grommets.

Figure 8 is a sectional view of a conventional type of gasket having metal surface layers and an inner layer of metal fibrous material.

Figure 9 is a fragmentary top plan view of a cylinder head gasket made in accordance with this invention, and Figure 10 is a top plan view of an exhaust gasket in accordance with this invention.

The cushion layer sealing material of this invention consists of metal fibers in closely compacted and interlocked relation. As one example of the form which the fiber-like metal may take for cushion sealing purposes, I have illustrated in the drawing a layer of metal "wool". Fiber-like metal of copper, Monel metal, lead, aluminum, and brass or highly heat resistant alloys, may also be employed and, in fact, any metallic material may be used which will have desired resistant properties and compressibility and form a sealing material.

I have found that the fiber-like metal not only strengthens the gasket in its resistance to high temperatures and high pressures, but also materially enhances its heat conductivity and transmission characteristics. The interlocking of the fibers assures increased strength.

Referring to Figure 1, the numeral 10 illustrates a cushion sealing layer of fiber-like material such as metal "wool". The numeral 11 indicates a metal interlay or backing layer having struck-up projections 12 embedded in the fibrous metal layer and the struck-out portions define openings 13 in the exposed surface of the metal layer. The sheet metal layer may take the form described in my Patent No. 1,776,140, dated September 16, 1930.

In Figure 2, I have illustrated the metal layer 11 as provided with projections 12 on opposite sides embedded in fibrous metal layers 10, arranged upon opposite sides of the interlay.

It is to be noted in Figures 1 and 2 that the projections 12 extend to the surface of the gasket and have their ends clenched over the metal fibrous material so that they lie in the plane of the surface of the gasket, as in my aforesaid patents.

In Figure 3, the projections 12 extend only partially through the layer 10, and in this construction the cushion layer may be of a density and thickness above the ends 14 of the projections 12, such that when the gasket is compressed between the surfaces of a joint, the projections will be brought to the surface. Since the metal fibrous material itself is heat conductive, it is not always necessary that the clamping pressure, or the structure of the gasket be such that the projections will be forced through to the surface of the gasket. In Figure 3ᵃ the layer 10 is shown on both sides of the sheet metal with the tangs projecting partially therethrough.

In Figure 4, I have shown a construction similar to Figure 1 and which also may be employed in connection with Figures 1, 2, 3, 5 and 7, wherein a surface layer 15 of resistant material, such as sheet metal, is employed. The layer 15 is preferably of metal foil, but any metal layer material may be employed or, in fact, any material which will resist the conditions prevailing at the joint may be used.

In Figure 6, I have illustrated a construction wherein the projections 12 extend through the metal layer 15 and are clenched down upon the same exteriorly thereof as shown at 16. In such a construction, the ends 14 of the tangs may be compressed into the foil 15 so as to form a smooth surface or the extent of the projection into and upon the layer 15 may be so small as to be negligible. The construction shown in Figure 6 is somewhat exaggerated.

The surface layer 15 may be adhesively united to the layer 10 as shown in Figure 4, or secured thereto by turning over the projections 12 as shown in Figure 6.

In Figure 5, the metal interlay 17 is devoid of projections and the layers 10 are adhesively united thereto. Although I have shown the layers upon opposite sides of the metal layer 17, in some cases, a layer 10 will be adhered to only one side.

In Figure 7, I have illustrated a gasket which consists of a layer 10 of the metal fibrous material. In such a gasket, the openings 18 which may be cylinder openings, for example, have their edges protected by grommets 19. This gasket is satisfactory for a number of purposes without the use of a metal facing or interlay.

In Figure 8, I have illustrated a gasket having metal faces 20 and 21 suitably joined together after the manner of the copper-clad asbestos gasket. In this construction, however, instead of asbestos or asbestos composition, the intermediate cushion layer consists of a layer of metal fibrous cushion material 10 in accordance with this invention.

The metal insert layer 11 is preferably of thin steel, but may consist of copper or any desired material which will be resistant to conditions prevailing at the joint. This is likewise true of the interlay 17, the grommets 19, and the layers 20 and 21.

In some cases, I may mix with the fibrous metal material a filler of suitable material, for example, a lubricant such as graphite. For some purposes, an amount of asbestos or other non-metallic material may be included in the metallic compressible layer.

I prefer to include in the metallic fiber-like structure an adhesive which will be resistant to the conditions prevailing at the joint, there being any number of commercially available adherent substances suitable for this purpose. The density of the fibrous metal layer 10 will be controlled, and, as stated, there may be included any suitable filler material which will be resistant to conditions surrounding the use of the gasket. There are many materials available for this purpose, for example suitably heat resistant casein adhesives, or synthetic resins. Silicate of soda may be used, and where high heat resistance is not necessary, I may employ a latex or latex composition, as hereinbefore described. The binder or filler may be included in the fiber-like mass either before it is compressed or partially compressed to sheet-like form, or thereafter. Some materials may serve both as a binder and a filler. It is preferred to incorporate the same, whether one or more substances are used, in the metallic fiber-like mass in such a manner as to thoroughly impregnate the same, so that the thread or fiber-like metal strands, which preferably are entangled, form a cohesive, adherent mass throughout. However, in some instances, it is found that an application of the adhesive confined more or less to the surfaces is sufficient. After application of the adhesive or filler, the body is thoroughly compressed to the desired sheet-like thickness and a dense compacted sheet is produced. As heretofore explained, this sheet is useful as such and without sheet metal reinforcing means. Although in all of the views some reinforcing means is shown, usefulness of the sheet-like material as such without reinforcing means will be understood.

The compressibility of the layer 10 will also be controlled, and will, in most instances, be a resultant of the density of the fibrous metal cushioning sealing layer. Thus, both compressibility and density may be controlled by the presence of an adhesive and a filler, or a filler-adhesive, as well as by the density of the fibrous metal material itself.

In preparing the products of Figures 1, 2, 3, 4, 5 and 6 of the invention, a suitable length of cushion material 10 and insert material 11 are combined. A sheet of the cushion material is preferably formed before it is combined with the insert, and the sheet includes the desired binder or filler. The two are then combined, and the cushion material in the combining operation is, of course, then subjected to further compression, which may increase its density. The surface of the sheet may, if desired, be knurled when subjecting it to compression. This knurling provides over the entire surface a multiplicity of closely arranged or compacted intersecting raised ridges which are relatively more compressible than the more compressed surface portions between the ridges. This arrangement lends to the gasket a greater degree of compressibility, enabling it to conform to the joint surfaces. In the case of the gasket of Figure 7, the gasket is formed to the required density and grommets are then affixed thereto. In the same manner, th gasket of Figure 8 is formed by placing the cushion layer between the metal layers and compressing the three layers together.

With respect to the gasket wherein a metal interlay 11 having tangs 12 stuck therefrom is used, it is to be understood that the tangs are somewhat resilient and readily permit the desired compressibility of the gasket to seal a joint when the contact surfaces of the joint are clamped together. Also, when the tangs 12 extend through the cushion layers and have their ends clamped over and embedded in the gasket surface, the spaces between the clenched portions will extend above the bent-over tips of the projections and the tips of the projections will lie in almost imperceptible recesses in the surface of the cushion layer. When the gasket is pressed between contact surfaces, however, the gasket will assume the form substantially as shown in the drawing.

While I have referred to metal fiber-like material, and particularly relatively thin or threadlike or hair-like fibers, such as "metal wool", it is to be understood, that bodies of less thickness or greater thickness may be used, and that the length of the fibers may vary to a considerable extent. In this connection, instead of using a wool type of fiber, I also use a floss type of metal fiber. In any event, it is necessary to use a metal material which will give the desired properties.

As will be observed in all of the forms described, the gasket is characterized by a relatively thin or "sheet-like" form, such as is suitable in internal combustion engines, and having approximately the thickness hereinbefore described. Moreover, in all forms, the layer of entangled metal fibers may be suitably compressed, and, if desired, may be densified by including fillers, whether metallic or non-metallic agents for adhering the fibers to one another. In all of the forms, the gaskets are of the all-metal type as distinguished from the combination sheet metal and mineral fiber "asbestos" gaskets of the type heretofore used. In other words, the gasket is metallic both in the cushion material, as well as in the sheet reinforce, as distinguished from previously used gaskets in which a non-metallic compressible material is combined with sheet metal. The metallic fibrous layer or layers provide the enhanced strength desired, and when combined with sheet metal reinforcing means, as described, produces a gasket having sufficient strength to maintain its unitary character while affording the compressibility which has heretofore been thought obtainable only in the combination sheet metal asbestos type of gasket.

In connection with the use of grommets, as shown in Figure 7, it is to be understood that, in some cases, a grommet will be secured about the peripheral edge of the gasket in the form shown in Figure 7, as well as in the other forms of the invention illustrated. In some cases, the grommet will be used only at the openings and, in other cases, only at the peripheral edge of the gasket.

While I have referred herein to the use of metallic reinforcements, facings and interlays, it is to be understood that, in some instances, the gasket will consist only of a layer of the metal fibrous material having the required strength, density and compressibility, and will be devoid of reinforcing means.

I claim:

1. A compressible all metal gasket comprising a metal sheet, opposed faces of the metal sheet having compressed layers of entangled wool or floss-like metal fibers, said fibers being in an amount and of sufficient length to form a compressible gasket resistant to temperatures and pressures encountered in high compression internal combustion engines, the compressible layers having incorporated therein a binder and densifying agent in amount to form a coherent sheet-like sealing body retaining the dominant metallic character and compressibility of the layers, and means for anchoring said fiber layers to said metal sheet.

2. A compressible all metal gasket comprising a metal sheet, one face of the metal sheet having a compressed layer of entangled wool or floss-like metal fibers, said fibers being in an amount and of sufficient length to form a compressible gasket resistant to temperatures and pressures encountered in high compression internal combustion engines, the compressible layer having incorporated therein a binder and densifying agent in amount to form a coherent sheet-like sealing body retaining the dominant metallic character and compressibility of the layer, and means for anchoring said fiber layer to said metal sheet.

GEORGE T. BALFE.